United States Patent [19]

Fukayama

[11] Patent Number: 4,852,315
[45] Date of Patent: Aug. 1, 1989

[54] READJUSTABLE FLOOR SYSTEM

[76] Inventor: Tateki Fukayama, 1909, Kodachi, Kawaguchiko-machi, Minami-Tsuru-gun Yamanashi-ken, Japan

[21] Appl. No.: 288,551

[22] Filed: Dec. 15, 1988

[51] Int. Cl.[4] .............................................. E04B 5/55
[52] U.S. Cl. ........................................ 52/220; 52/480
[58] Field of Search ................. 52/220, 263, 407, 480, 52/126.6

[56] References Cited

U.S. PATENT DOCUMENTS

| 2,862,367 | 12/1958 | Silverstein | 52/220 X |
| 3,396,501 | 8/1968 | Tate | 52/263 X |
| 4,124,324 | 11/1978 | Augis | 52/220 X |

FOREIGN PATENT DOCUMENTS

| 2153732 | 5/1973 | Fed. Rep. of Germany | 52/220 |
| 1306680 | of 1962 | France | 52/126.6 |
| 919494 | of 1963 | United Kingdom | 52/220 |

Primary Examiner—David A. Scherbel
Assistant Examiner—Jerrold D. Johnson
Attorney, Agent, or Firm—Wenderoth, Lind & Ponack

[57] ABSTRACT

A readjustable floor system permits cables of various sorts to be freely distributed therein and is capable of very flexibly coping with expansion and relocation of cables of various sorts already distributed. This system is constructed by forming unit members of an approximately U-shaped cross section each composed of a pair of floor member-supporting joists disposed parallelly on a floor surface in an opposed relation to each other across a fixed interval and a bottom plate laid to interconnect the lower parts of the joists, defining a space for distribution of cables and pipes inside the unit members, partitioning the space through an antistatic sheet, and detachably mounting unit floor boards one each on top of the unit members.

4 Claims, 4 Drawing Sheets

READJUSTABLE FLOOR SYSTEM

BACKGROUND OF THE INVENTION AND RELATED ART STATEMENT

This invention relates to a readjustable floor system which, in a so-called intelligent building inherently and essentially necessitating freely readjustable distribution of power, communication and transmission cables for connection to office-automating machines and tools and telephones, for example, permits amply free distribution of such cables.

In recent years, various office-automating machines and tools which are intended to improve office work and data transmission work in operational efficiency have been finding their way into an increasing number of offices. This trend has been urging the desirability of enabling power, communication and transmission cables of various sorts for connection to such office-automating machines and tools to be freely distributed in a perfectly concealed condition instead of being randomly laid out conspicuously on the floor.

Under these circumstances, the floor duct method which consists in burying ducts under office floors and the flat cable method which comprises preparing cables of flattened cross sections and distributing these cables under ordinary tile carpets have been proposed.

In the case of the floor duct method, because the lines of distribution and the volume of cables for distribution are predetermined by the positions of buried ducts and the diameters of cables selected to be laid out, it naturally follows that the freedom of distribution of cables has its own limit. The most serious one of the problems encountered by this method resides in the fact that this method is incapable of flexibly coping with expansion and relocation of the office-automating machines and tools already installed.

The flat cable method is capable of flexibly coping with the expansion and relocation of already distributed cables as compared with the floor duct method. It nevertheless poses as a new problem the disadvantage that the cables to be used are required to be specially molded in flattened cross sections and, whenever the already distributed cables are increased or relocated, the tile carpets already placed are required to be peeled off the floor bed and then replaced.

OBJECTS AND SUMMARY OF THE INVENTION

One object of this invention is to provide a readjustable floor system which enables cables of various sorts to be freely distributed with an extremely simple structure.

Another object of this invention is to provide a readjustable floor system which is capable of very flexibly coping with expansion and relocation of already distributed cables of various sorts with a very simple structure.

To accomplish the objects described above, according to this invention, there is provided a readjustable floor system comprising unit members of an approximately U-shaped cross section each composed of a pair of floor member-supporting joists disposed parallelly on a floor surface in an opposed relation to each other across a fixed interval and a bottom plate laid to interconnect the lower parts of the pair of floor member-supporting joists, the unit members defining therein a space for distribution of cables and pipes, a plurality of antistatic sheets each having opposite ends fastened to the pair of floor member-supporting joists for vertically partitioning the space, and unit floor boards detachably mounted one each on top of the unit members.

According to this invention, there is also provided a readjustable floor system comprising unit members of an approximately U-shaped cross section each composed of a pair of floor member-supporting joists disposed parallelly on a floor surface in an opposed relation to each other across a fixed interval and a bottom plate laid to interconnect the lower parts of the pair of floor member-supporting joists, the unit members defining therein a space for distribution of cables and pipes, a plurality of antistatic sheets each having opposite ends fastened to the pair of floor member-supporting joists for vertically partitioning the space, each of the antistatic sheets concurrently serving as a heat-transfer sheet and having a groove-shaped receptacle, unit floor boards detachably mounted one each on top of the unit members, and a plurality of thermal medium-circulating pipes each distributed across the groove-shaped receptacle of the heat-transfer sheet.

In either of the constructions mentioned above, this invention contemplates additionally having dewproofing members, one of which is interposed between the bottom plates of the unit members and the floor surface.

DETAILED DESCRIPTION OF THE PREFERRED EMBODIMENTS

Figure 1:
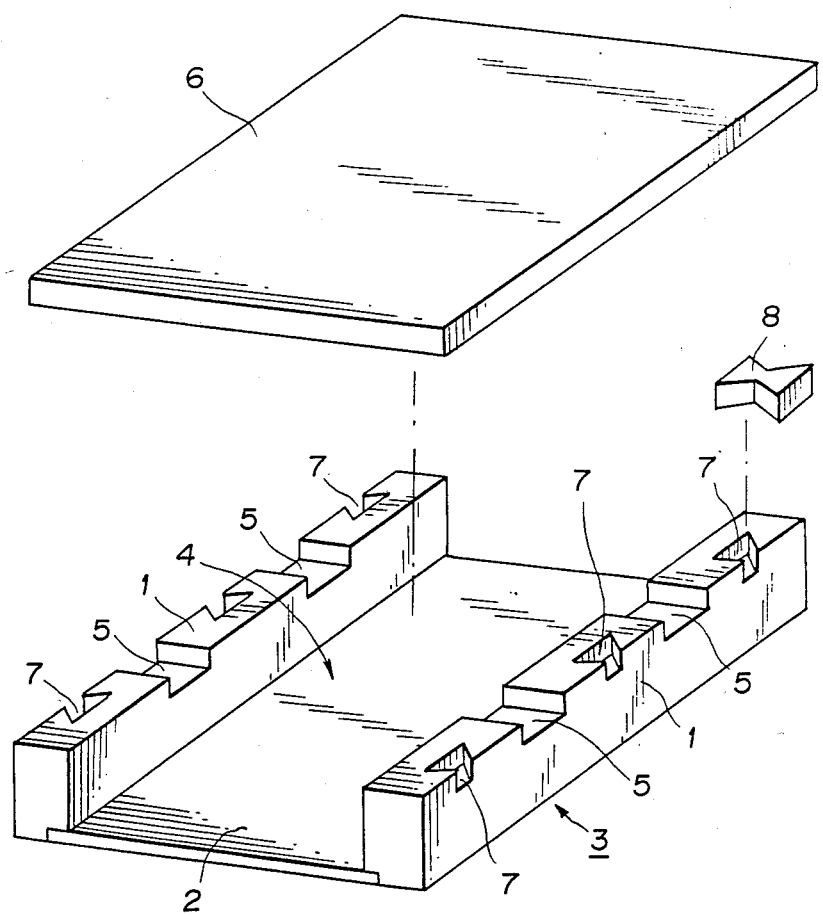
FIG. 1 is a perspective view illustrating in a separated state a unit member and a unit floor board used for an embodiment of this invention.

This invention contemplates a readjustable floor system which is produced by forming unit members of an approximately U-shaped cross section each composed of a pair of floor member-supporting joists disposed parallelly on a floor surface in an opposed relation to each other across a fixed interval and a bottom plate laid to interconnect the lower parts of the pair of floor member-supporting joists, defining a space for distribution of cables and pipes inside the unit members, vertically partitioning the space through antistatic sheets, and detachably mounting unit floor boards one each on top of the unit members.

This invention further contemplates a floor system which is produced by forming unit members of an approximately U-shaped cross section each composed of a pair of floor member-supporting joists disposed parallelly on a floor surface in an opposed relation to each other across a fixed interval and a bottom plate laid to interconnect the lower parts of the pair of floor member-supporting joists, defining a space for distribution of cables and pipes inside the unit members, vertically partitioning the space through heat-transfer sheets concurrently serving as antistatic sheets, distributing thermal medium-circulating pipes across groove-shaped receptacles formed in the heat-transfer sheets, and detachably mounting unit floor boards one each of top of the unit members.

In either of the constructions embodying this invention as mentioned above, the present invention contemplates additionally having dewproofing members, one of which is interposed between the bottom plates of the unit members and the floor surface.

In the present invention, when a dewproofing sheet is stretched out on the floor surface and the unit members are laid end to end and side by side on the dewproofing sheet, the spaces for distribution of cables and pipes which are defined inside the individual unit members are joined continuously so as to form desired lines for distribution of cables and pipes. Then, the cables and pipes of various sorts for connection to the office-automating machines and tools can be freely distributed through the continued ducts formed of joined spaces. Thereafter, the unit floor boards are mounted one each directly above the pairs of floor member-supporting joists joined end to end and side by side. Thus, a floor structure having the cables of various sorts easily and freely distributed therein can be assembled with ease.

Particularly in the case where high-voltage cables and low-voltage cables are distributed together, generation of noise poses itself as a problem. This invention precludes this problem by adopting the construction in which the spaces are partitioned with the antistatic sheets so that the high-voltage cables and the low-voltage cables may be distributed in a separated fashion via the antistatic sheets.

Moreover, in the construction of a floor structure in accordance with this invention, when the spaces for distribution of cables and pipes are vertically partitioned with heat-transfer sheets serving concurrently as antistatic sheets and thermal medium-circulating pipes are distributed across the groove-shaped receptacles formed in the heat-transfer sheets, continuous ducts formed of the joined spaces can be utilized for ready installation of a floor-warming unit. An ideal floor warming can be attained by circulating a suitable thermal medium such as hot water through the thermal medium-circulating pipes.

The possible occurrence of dew by the temperature difference causable in floor warming can be effectively prevented by the interposition of a dewproofing sheet between the bottom plates of the unit members and the floor surface.

Now, the present invention will be described in detail below with reference to the embodiments illustrated in the accompanying drawings.

Figure 2:
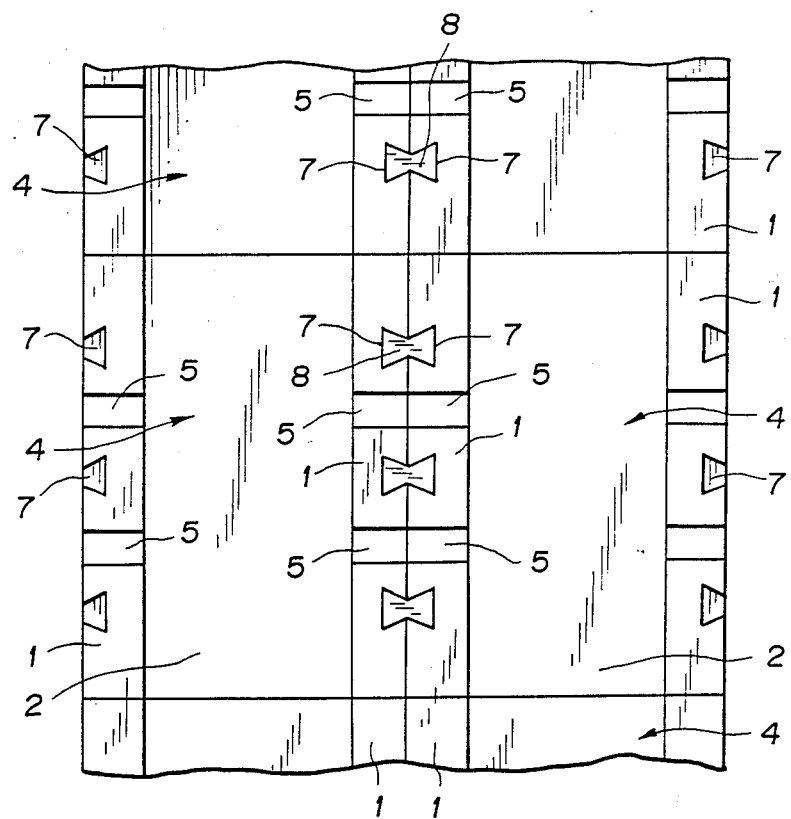
FIG. 2 is a plan view of the essential part illustrating the unit members in a joined state.

The basic structure of the readjustable floor system according to the present invention is obtained, as illustrated in FIG. 1 and FIG. 2, by forming unit members 3 of an approximately U-shaped cross section each composed of a pair of floor member-supporting joists 1 disposed parallelly on a concrete floor surface of an intelligent building in an opposed relation to each other across a fixed interval and a bottom plate 2 laid to interconnect the lower parts of the pair of floor member-supporting joists 1, thereby enabling the unit members 3 to be laid continuously end to end and side by side on the concrete floor surface, and detachably mounting unit floor boards 6 one each on top of the floor member-supporting joists 1, thereby defining spaces 4 for distribution of cables and pipes inside the unit members 3.

When the unit members 3 of the U-shaped cross section are continuously laid end to end and side by side on the concrete floor surface, the spaces 4 defined for distribution of cables and pipes inside the individual unit members 3 are naturally continued in the longitudinal direction. A plurality of depressed through parts 5 are formed in each of the supporting joists 1 as illustrated in FIG. 1 or FIG. 2. The spaces 4, therefore, are also continued in the lateral direction across the through parts 5.

The pair of floor member-supporting joists 1 each have a plurality of holes 7 with a lateral opening and an upper opening dug symmetrically in the portions thereof not occupied by the depressed through parts 5. When the unit members 3 are continuously laid end to end and side by side, therefore, connecting members 8 can be fitted into abutting holes 7 in the adjoining supporting joists 1 for the purpose of mutually fastening the unit members 3 with ample fastness particularly in the lateral direction.

Desirably, the floor member-supporting joists 1 are long rectangular pieces of wood, concrete, synthetic resin or metallic substance prepared in various lengths. Depending on the area, shape, etc. of the concrete floor surface given to be covered with the floor system, therefore, the unit members 3 of the optimum length may be offered.

The unit floor boards 6 are made of stratiform wood such as plywood, stone, concrete panel having core wires buried therein, synthetic resin panel or metallic plate. They are invariably prepared in a size suitable for them to be continuously laid one each on the upper surfaces of the pair of supporting joists 1. It is necessary that they be produced in size and weight just proper for them to be easily removed from the upper surfaces of the supporting joists 1 with the aid of a known suction means or a handle formed at a suitable position thereof (not shown specifically). It is likewise necessary that the unit floor boards 6, when mounted in such a manner that the lateral parts thereof ride directly on the supporting joists 1, manifest strength large enough to withstand normal load exerted upon the central part thereof.

Figure 3:
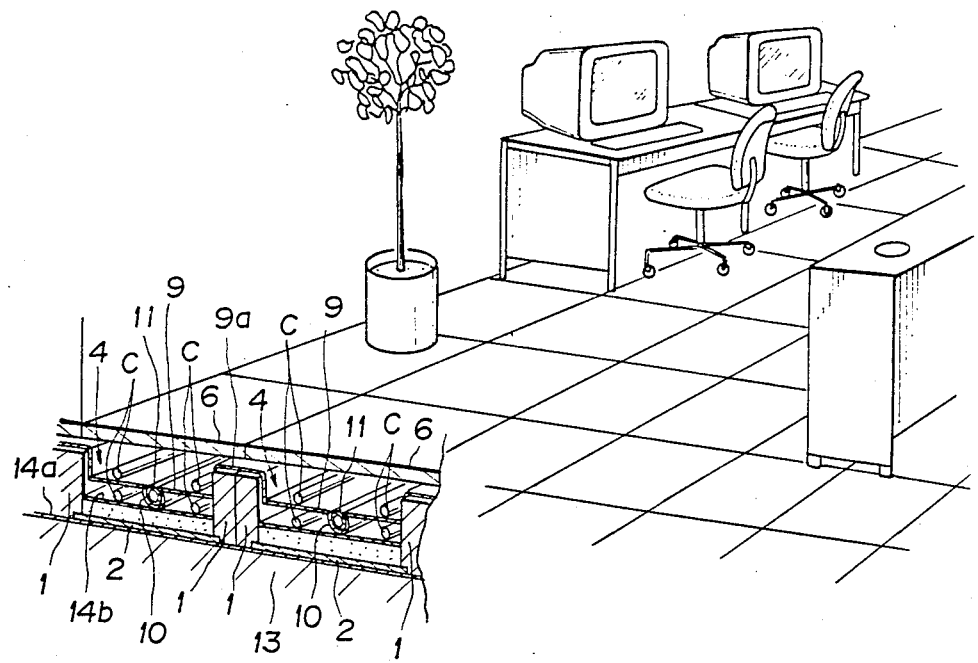
FIG. 3 is a partially cutaway perspective view illustrating a completed readjustable floor system according to this invention.
Figure 4:
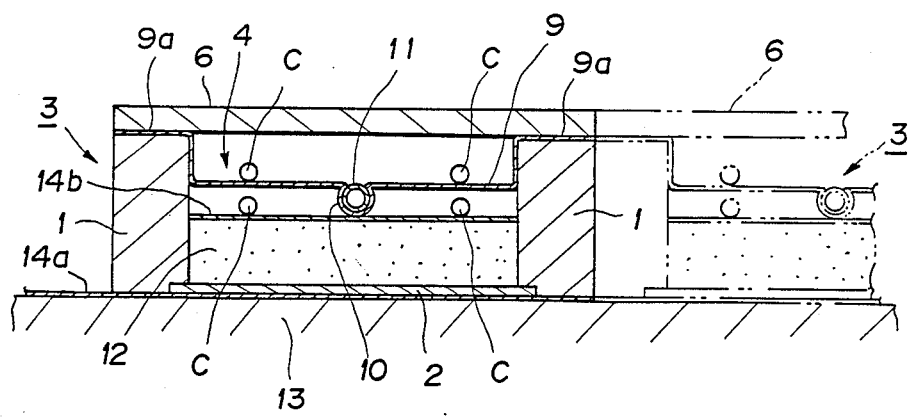
FIG. 4 is a cross section illustrating the essential part of the readjustable floor system of FIG. 3.

In the present embodiment, the floor produced by assembling the floor system acquires a structure fit concurrently for a floor-warming mechanism. To be specific, the floor system of this invention permits the floor of a given room to be warm by disposing inside the spaces 4 combination antistatic and heat-transfer sheets 9 of copper each having the central part thereof depressed and the opposite lateral ends 9a thereof fastened to the upper surfaces of the pair of floor member-supporting joists 1, and disposing thermal medium-circulating pipes 11 one each in grooved-shaped receptacles 10 formed in the central part of the heat-transfer sheets 9 as illustrated in FIG. 3 and FIG. 4, and effecting forced circulation of a suitable thermal medium such as hot water through the pipes 11. In FIG. 4, reference numeral 12 designates a heat insulator suitably packed between the heat-transfer sheets 9 and the bottom plates 2.

Furthermore, in the present embodiment, dewproofing sheets 14a and 14b are respectively interposed between the bottom plates 2 laid continuously side by side and the surface of a concrete floor 13 and between the heat insulators 12 and the heat-transfer sheets 9 as illustrated in FIG. 3 and FIG 4 so as to effectively prevent the occurrence of dew due to the temperature difference ascribable to the floor warming. This preclusion of dew formation keeps the cables C distributed in the floor from otherwise possible adverse effects of water condensate.

In producing a floor structure in an intelligent building by copiously using the unit members 3 and the unit floor boards 6 constructed as described above, first the surface 13 of a concrete floor is entirely covered with the dewproofing sheet 14a and then a multiplicity of unit members 3 are laid on the dewproofing sheet 14a continuously end to end and side by side. As a result, the spaces 4 defined for distribution of cables and pipes inside the individual unit members 3 are continued in the longitudinal direction and, at the same time, they are continued in the lateral direction across the through parts 5 so as to give birth to a multiplicity of continuous distribution lines.

After the assembly has proceeded to this point, the heat-transfer plates 9 are set in place with the opposite lateral ends 9a thereof fastened to the upper surfaces of the floor member-supporting joists 1 of the unit members 3 and the heat medium-circulating pipes 11 are laid one each in the groove-shaped receptacles 10 formed in the heat-transfer plates 9. Thus, the floor-warming mechanism can be easily incorporated in the floor structure by making effective use of the continuous spaces 4. The floor warming of a room can be accomplished by completing the floor structure as described above and then circulating a suitable thermal medium such as hot water supplied from a boiler etc. through the heat medium-circulating pipes 11.

When the spaces 4 which have been continued longitudinally and laterally and made to incorporate therein a floor-warming mechanism are suitably selected, they permit connection of cables C of various sorts to various office-automating machines and tools to be freely distributed in the longitudinal and lateral directions. After the free distribution by the use of these continued spaces 4 has been completed, the floor structure aimed at can be immediately completed by mounting the unit floor boards 6 sequentially and continuously in such a manner that they will ride one each directly on the supporting joists 1 which have the opposite lateral ends 9a of the heat-transfer plates 9 fastened thereto.

Generally in the distribution of cables C of various sorts, there is a possibility of noise being generated where high-voltage cables and low-voltage cables are laid out closely together. In the light of this possibility, the present invention contemplates vertically partitioning the spaces 4 with the combination antistatic and heat-transfer sheets 9 of copper as described above, thereby allowing high-voltage cables and low-voltage cables to be distributed separately above and below the heat-transfer plates 9. Thus, the present invention is perfectly free from such perennial problems as inevitable generation of noise.

Moreover, in the present embodiment, there is employed a structure for effectively precluding the formation of dew ascribable to the temperature difference inherent in floor warming by interposing the dewproofing sheets 14a and 14b respectively between the bottom plates 2 and the surface of the concrete floor 13 and between the heat insulators 12 and the heat-transfer plates 9. This embodiment, therefore, completely precludes the possibility of water condensate inflicting adverse effects on the cables C.

When the cables C which have been freely distributed as described above are obliged to be redistributed on account of expansion or relocation of office-automating machines and tools and telephones, for example, the required redistribution of the cables C can be very flexibly and easily accomplished without requiring any repair work by removing pertinent unit floor boards 6 from the upper surfaces of the supporting joists 1 to expose the continued spaces 4 and then redistributing the cables C by again utilizing the continued spaces 4.

Figure 5:
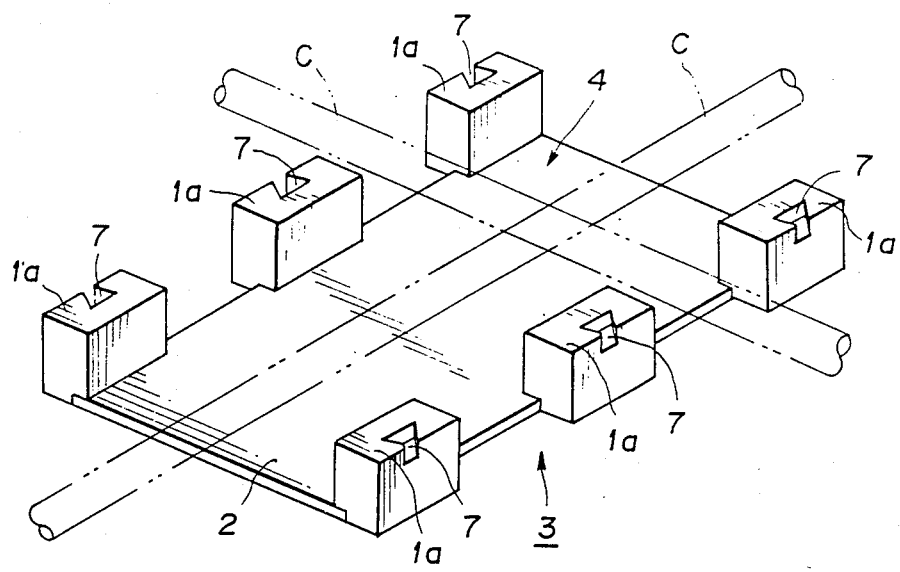
FIG. 5 is a perspective view illustrating another unit member usable in this invention.
Figure 6:
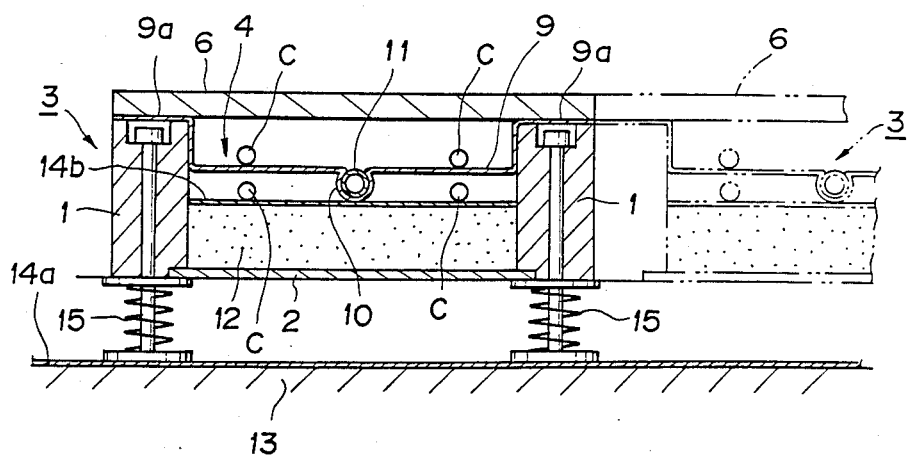
FIG. 6 is a cross section illustrating another embodiment of the readjustable floor system according to this invention.

While in this embodiment each of the supporting joists 1 of the unit member 3 is a long rectangular piece having the through parts 5 inserted in the lateral sides thereof and also having the holes 7, this is by no means limitative. Optionally, each of the supporting joists 1 may comprise a plurality of short pieces 1a provided with holes 7 and spaced at fixed intervals. In this case, cables C can also be distributed and branched in the longitudinal and lateral directions as illustrated in FIG. 5.

The embodiment has been also described as causing the unit members 3 to be laid out on the surface of the concrete floor 13. Optionally, this embodiment may be modified to produce a resilient floor structure by causing shock-absorbing means 15 such as springs or rubber members to underlay the supporting joists 1 of the unit members 3. Even in this modification, it is permissible to have a dewproofing sheet 14a interposed between the surface of the concrete floor 13 and the shock-absorbing means 15 and another dewproofing sheet 14b interposed similarly on the upper side of the bottom plates 2.

Furthermore, the embodiment has been described as having the thermal medium-circulating pipes 11 for floor warming distributed through the heat-transfer plates 9. This particular setup is not critical to this invention. Optionally, pipes of the sorts suitable for connection to facilities for supply and discharge of water and facilities for fire prevention may be distributed in the floor structure of this embodiment.

In accordance with the readjustable floor system contemplated by the present invention, desired lines for distribution of cables and pipes are formed by covering the floor surface with the dewproofing sheet and laying the unit members continuously end to end and side by side on the dewproofing sheet, thereby allowing the spaces defined for distribution of cables and pipes inside the individual unit members to continue into one another. Thereafter, the cables and pipes freely distributed along the aforementioned lines can be completely concealed by mounting the unit floor boards sequentially and continuously on the pairs of floor member-supporting joists.

Particularly in the distribution of cables, the spaces are partitioned with antistatic sheets so that high-voltage cables and low-voltage cables may be separately distributed through the antistatic sheets. Thus, noise which is possibly generated where high-voltage cables and low-voltage cables are distributed closely together can be precluded infallibly.

Where expansion or relocation of the existing office-automating machines and tools necessitates redistribution of the existing cables, the floor structure of the present embodiment can flexibly cope with the redistribution. Thus, the floor system contemplated by the present invention is highly effective in furnishing an intelligent building with an updated floor.

In accordance with this invention, the floor structure can incorporate therein a floor-warming mechanism by vertically partitioning the spaces for the distribution of cabes and pipes with the combination antistatic and heat-transfer sheets and distributing the thermal medium-circulating pipes in the groove-shaped receptacles formed in the heat-transfer sheets by making effective use of the continued spaces. Also from this point of view, this invention enjoys very high economic utility.

Moreover, since the dewproofing sheet is interposed between the bottom plates of the unit members and the floor surface, the formation of dew ascribable to the temperature difference which is inherent in floor warming can be effectively precluded.

What is claimed is:

1. A readjustable floor system comprising:
   unit members of an approximately U-shaped cross section each composed of a pair of floor member-supporting joists disposed parallelly on a floor surface in an opposed relation to each other across a fixed interval and a bottom plate laid to interconnect the lower parts of said pair of floor member-supporting joists, said unit members defining therein a space for distribution of cables and pipes;
   a plurality of antistatic sheets each having opposite ends fastened to said pair of floor member-supporting joists for vertically partitioning said space; and
   unit floor boards detachably mounted one each on top of said unit members.

2. A readjustable floor system according to claim 1, further comprising at least one dewproofing member interposed between said bottom plates of said unit members and the floor surface.

3. A readjustable floor system according to claim 1, wherein each of said antistatic sheets concurrently serves as a heat-transfer sheet and has a groove-shaped receptacle, and further comprising a plurality of thermal medium-circulating pipes each distributed across said groove-shaped receptacle of said heat-transfer sheet.

4. A readjustable floor system according to claim 3, further comprising at lest one dewproofing member interposed between said bottom plates of said unit members and the floor surface.

* * * * *